Figure 1:
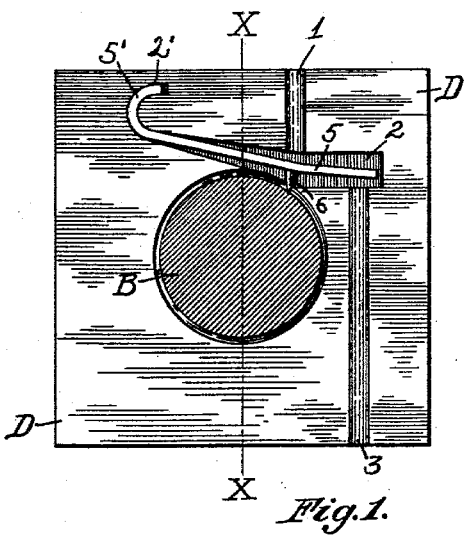

No. 720,724. PATENTED FEB, 17, 1903.
H. MINCK.
LOCK NUT.
APPLICATION FILED OCT. 23, 1902.

NO MODEL.

Witnesses:
J. C. Duvall.
R. E. Randle.

Inventor:
HARRY MINCK,
by his attorney,
Robert W. Randle.

UNITED STATES PATENT OFFICE.

HARRY MINCK, OF RICHMOND, INDIANA.

LOCK-NUT.

SPECIFICATION forming part of Letters Patent No. 720,724, dated February 17, 1903.

Application filed October 23, 1902. Serial No. 128,428. (No model.)

*To all whom it may concern:*

Be it known that I, HARRY MINCK, a citizen of the United States, residing in the city of Richmond, in the county of Wayne and State of Indiana, have invented new and useful Improvements in Lock-Nuts; and I do hereby declare the following to be a full, clear, and exact description of the same, such as will enable others skilled in the art to which it appertains to make and use the same.

The object of my present invention, broadly speaking, is to provide a lock-nut of simple and inexpensive construction adapted to be secured to bolts and which may not become inadvertently removed therefrom.

Another object is to provide a lock-nut composed of a minimum of parts, which will be simple in character, easily operated and maintained, which will be easily placed in position on a bolt, easily removed when desired, yet difficult of becoming accidentally removed.

Another object is the provision of a locknut which will be capable of secure attachment to bolts without any preparation whatever of the bolts therefor, and another object is the provision of an article of manufacture, a lock-nut which can be manufactured and sold at a comparatively low price.

Other objects and advantages of my invention will appear from the following specification and from the drawings forming a part thereof.

My invention consists in a lock-nut embodying certain new and useful and novel features and details of construction and relative disposition of parts, substantially as herein set forth, illustrated in the drawings, and incorporated in the claims hereunto appended.

In detail the invention consists in a lock-nut substantially as shown in the accompanying drawings, in which—

Figure 3:
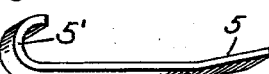
Figure 2:
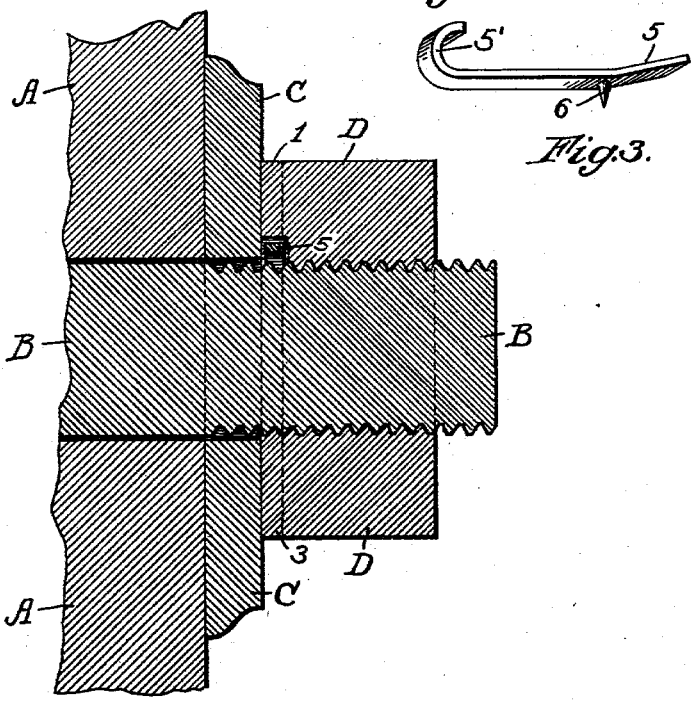

Figure 1 is a rear elevation of my lock-nut. Fig. 2 is a central sectional view of same, taken on the line X X of Fig. 1; and Fig. 3 is a detail perspective view of the spring.

Similar indices refer to and denote like parts throughout the several views.

In the drawings, A denotes some stationary object, such as a metal plate or the like, with an opening therethrough to receive a bolt. B represents a portion of a bolt protruding through said plate A to receive my nut-lock.

C represents a washer surrounding the bolt B and contacting with the face of the plate A.

D represents a substantially square nut provided with a central threaded opening therethrough to receive the threaded end of the bolt B.

The above-named parts may be of any well-known construction, and my invention consists in providing in the rear face of the nut a substantially oblong aperture or cavity 2, opening into the central opening and then extending slightly upward contractingly and terminating in a curve 2' near one edge of the nut. Slightly to one side of the center of the nut I provide a small channel 1, leading from the upper edge of the nut into the cavity 2, and leading from the lower edge of the nut is provided a small channel 3, which leads into the cavity 2 near its base.

5 represents a flat steel spring, substantially of the form shown in Fig. 3, the curved end 5' of which is of same contour and adapted to fit in the portion 2' of the above-described cavity. The free end of the spring 5 forms a tongue adapted to be moved up and down in the cavity 2. On the under side of the spring 5, opposite the channel 1, is a downwardly-projecting spur 6, adapted to contact at an angle with the surface of the bolt B.

It will now be seen that the plate A being stationary, the bolt B extending through the plate A to the right, as shown in Fig. 2, the washer C is then placed around the bolt B and brought into contact with the plate A. The nut D is then screwed onto the bolt B, with the rear face (shown in Fig. 1) facing the washer C. As the nut D is screwed on the bolt B the spur 6 will follow around on the surface of the bolt B, and the nut D is then tightly contacted with the washer C by a wrench in the usual manner. Should it now be attempted to unscrew the nut D, then the spur 6 being set at an angle the point thereof will engage in the surface of the bolt B and prevent further movement of the nut. In order to more firmly secure the spur 6 in the surface of the bolt, a metal rod may be inserted in the channel 1, so that it will rest on the spring 5, and the end of said rod may be given a blow with a hammer, which will embed the point of the spur 6 into the bolt, and it will be retained there by the resiliency of the spring 5. Should it be desired to remove the nut D from the bolt B, a rod may be inserted in the channel 3 against the free end of the spring 5, and by then pressing on said rod the spring 5 will be lifted up, and thereby the spur 6 will be lifted out of engagement with the bolt B, and the nut can then be removed in the usual manner.

It will be noticed that when assembled as above described no part of my mechanism will be exposed, except the openings into the channels 1 and 3, and even these may be plugged, if desired.

My invention is perfectly adapted to accomplish the results for which it is intended, and it is evident that changes in and modifications of the specific construction herein shown and described may be made and that analogous parts may be used to accomplish the same results without departing from the spirit of my invention or sacrificing any of its many advantages, and the specific construction of the details of the invention may be variously changed without altering the essential principles which are claimed as new.

Having now fully shown and described my invention and the best means for its construction and use to me known at this time, what I claim as new, and desire to secure by Letters Patent of the United States, is—

1. In a lock-nut provided with a cavity in its rear face, a flat spring secured in said cavity at one end thereof, the other end of the spring being free to vibrate in said cavity, a spur extending down from said spring adapted to extend at an angle into the central opening of the nut, and channels extending upward and downward from said cavity through the sides of the nut, affording access to the spring when the nut is secured, all substantially as shown and described and for the purposes set forth.

2. A nut having a cavity formed in its rear face, a spring located in said cavity, a spur extending from the spring into the central opening of the nut, and channels, affording access to said spring when the nut is secured, leading upward and downward from said cavity, substantially as specified and shown.

In testimony whereof I have hereunto signed my name to this specification in the presence of two subscribing witnesses.

HARRY MINCK.

Witnesses:
R. W. RANDLE,
R. E. RANDLE.